United States Patent
Piendl

(10) Patent No.: US 11,243,663 B2
(45) Date of Patent: Feb. 8, 2022

(54) METHOD FOR OPERATING AN INFORMATION DEVICE

(71) Applicant: Robert Bosch GmbH, Stuttgart (DE)

(72) Inventor: Michael Piendl, Ascha (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/635,597

(22) PCT Filed: Jun. 6, 2018

(86) PCT No.: PCT/EP2018/064816
§ 371 (c)(1),
(2) Date: Jan. 31, 2020

(87) PCT Pub. No.: WO2019/025055
PCT Pub. Date: Feb. 7, 2019

(65) Prior Publication Data
US 2020/0241709 A1 Jul. 30, 2020

(30) Foreign Application Priority Data

Jul. 31, 2017 (DE) ...................... 10 2017 213 117.9

(51) Int. Cl.
*G06F 3/0482* (2013.01)
*G06F 3/0486* (2013.01)
*G06F 3/0488* (2013.01)

(52) U.S. Cl.
CPC .......... *G06F 3/0482* (2013.01); *G06F 3/0486* (2013.01); *G06F 3/04883* (2013.01)

(58) Field of Classification Search
CPC ....... G06F 3/048; G06F 3/0482; G06F 3/0486
See application file for complete search history.

(56) References Cited

U.S. PATENT DOCUMENTS

2012/0124523 A1* 5/2012 Zhang .................... G06F 9/451
715/841
2014/0282213 A1* 9/2014 Musa .................... G06F 3/0481
715/781

FOREIGN PATENT DOCUMENTS

EP 2442221 4/2012
EP 2490113 8/2012

OTHER PUBLICATIONS

"Windows 3.1" Published Jul. 8, 2017 retrieved from https://web.archive.org/web/20170708062827/http://toastytech.com/guis/win31.html.*

(Continued)

*Primary Examiner* — Pei Yong Weng
(74) *Attorney, Agent, or Firm* — Michael Best & Friedrich LLP

(57) ABSTRACT

A method for operating an information device (20) having at least one display unit (22), wherein the method comprises: presenting a menu (24) having at least one sub-item (26, 28) at a first position on the display unit (22), receiving a first user input, wherein the first user input is used to select one of the sub-items (26, 28) of the menu (24), taking the selection of the sub-item (26, 28) of the menu (24) as a basis for identifying a window (30) having one or more control elements (32, 66, 70, 72) selectable by a further, second user input, presenting the identified window (30) having the one or more control elements (32, 66, 70, 72) on the display unit (22) at or adjacently to one side of the first menu and/or instead of the menu (24), receiving a third user input, wherein the third user input is used to position the window (30) on the display unit (22) independently of a first position of the menu (24) on the display unit (22).

18 Claims, 5 Drawing Sheets

(56) References Cited

OTHER PUBLICATIONS

International Search Report for Application No. PCT/EP2018/064816 dated Aug. 17, 2018 (English Translation, 2 pages).
Anonymous, "Windows 3.1," toastytech.com, Jul. 8, 2017, 7 pages.
Wagner, K., "Widows 8 Survival Guide: All the Tips, Tricks, and Workarounds," Dec. 25, 2013, 9 pages.

* cited by examiner

METHOD FOR OPERATING AN INFORMATION DEVICE

BACKGROUND OF THE INVENTION

The invention relates to a method for operating an information device.

EP 2 490 113 B1 discloses a method for controlling operation of a display device according to a user input.

EP 2 442 221 B1 discloses an interface method for controlling a menu on an electronic apparatus.

SUMMARY OF THE INVENTION

A method for operating an information device having at least one display unit is proposed, wherein the method comprises:

presenting a menu having at least one subitem at a first position on the display unit, receiving a first user input, wherein one of the subitems of the menu is selected by means of the first user input, identifying, on the basis of the selection of the subitem of the menu, a window having one or more control elements which can be selected by means of a further, second user input, presenting the identified window having the one or more control elements on the display unit on one side or adjacent to one side of the first menu and/or instead of the menu, receiving a third user input, wherein the window is positioned on the display unit by means of the third user input independently of a first position of the menu on the display unit.

An information device can be understood as meaning a device for presenting or displaying information to a viewer or a user. Furthermore, a user can make user inputs on the information device. A display unit can be understood as meaning a unit for displaying or presenting data and/or information, for example menus, wherein a viewer, in particular, can perceive the presented information and/or data, for example menus. A display unit may be, for example, in the form of a display, for example an LCD display.

The advantage of the method is that the menus and windows can be operated more quickly and more easily by a user. A user can advantageously shift, position and/or fix the windows on the display unit. As a result, the operator or user can position a window on a display unit by means of user inputs, as a result of which the operator or user can personalize an interface of the display unit.

In one further development, a path on the display unit is predefined by means of the third user input, wherein the window is shifted along the predefined path independently of the first position of the menu on the display unit. In one advantageous configuration, the window is shifted along the predefined path from a first position of the window to a second position of the window. As a result, a user can advantageously shift the window or position and/or fix it at a desired position on the display unit. As a result, a user can advantageously personalize the display unit, as a result of which operation of the information device is simpler and faster for the user.

A first point on the display unit is advantageously selected by means of the first user input, wherein the first point on the display unit is within one of the subitems of the menu and/or on one of the subitems of the menu. This ensures that the associated window which is selected by the user by means of the first user input is identified. This preferably facilitates operation or control of the display unit for a user.

In one further development, a size of the window positioned independently of the first position of the menu on the display unit can be changed by means of a fourth user input. As a result, the user can advantageously personalize the interface of the display unit. This makes it possible to ensure fast and simple and safe operation of the information device. The size of the window can be changed by means of the fourth user input independently of the first menu.

In one embodiment, a second window can be positioned on the display unit independently of a first position of the first menu and independently of a second position of the first window. This makes it possible to ensure that a user can position a plurality of windows independently of one another on the display unit. This ensures personalization of the display unit, as a result of which the user can operate the information device in a faster and simpler manner.

The menu and/or the window is/are preferably presented as a dropout menu. This makes it possible to ensure that the window is displayed quickly and safely to a user. A dropout menu can also be referred to as a fly-out menu or as a pop-up menu.

One or more subitems and/or contents of the menu can also be advantageously presented in the window. As a result, a viewer or a user can discern, for example, which menu is involved or can draw conclusions on the menu or the subitem of the menu.

In one embodiment, a fifth user input is received, wherein a control element of the window is selected by means of the fifth user input, and wherein an action is triggered on the basis of the selection of the control element of the window. This makes it possible to ensure fast and simple operation of the display unit.

In one further development, a user input is made by means of a computer mouse and/or a keyboard and/or by touching the display unit and/or by swiping on the display unit. This makes it possible to ensure fast and simple operation of the display unit and/or the information device.

An information device is also proposed, wherein a method for operating an information device can be carried out on the information device.

The information device advantageously has at least one display unit for presenting a menu having at least one subitem and for presenting the windows having one or more control elements. This makes it possible to ensure that the menu and/or the windows is/are presented on the display unit to a viewer of the display unit.

In one embodiment, the information device has at least one input apparatus for capturing at least one user input. This makes it possible to ensure that a user input by a viewer or a user is detected, thus making it easier for a user to operate the information device.

Furthermore, the display unit is advantageously in the form of a touch display. The advantage is that a user can input inputs via the touch display, for example using his fingers. This makes it possible to ensure simple and fast operation of the display unit and/or of the information device.

A computer program is also proposed, comprising instructions which, when the program is executed by an information device, cause the latter to carry out the method for operating an information device. This makes it possible to ensure simple and fast operation of the display unit and/or of the information device.

BRIEF DESCRIPTION OF THE DRAWINGS

Exemplary embodiments of the invention are illustrated in the drawings and are explained in more detail in the following descriptions. Identical reference signs are used for the elements which are illustrated in the various figures and have a similar effect, in which case the elements are not described repeatedly. In the drawings.

DETAILED DESCRIPTION

Figure 1:
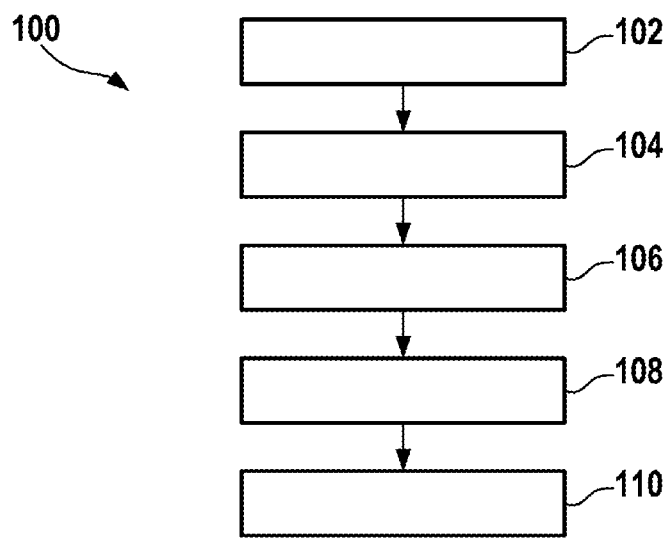
FIG. 1 shows a schematic illustration of a method for operating an information device according to one exemplary embodiment of the present invention.

FIG. 1 shows a schematic illustration of a method 100 for operating an information device. The information device preferably has at least one display unit. In a first step 102 of the method 100, a menu having at least one subitem is presented at a first position on the display unit. The presentation of the menu at a first position on the display unit can be triggered by a user input. As an alternative, the menu can already be presented on the display unit in one embodiment.

In a second step 104, a first user input is received, wherein one of the subitems of the menu is selected by means of the first user input. In other words, a user can select one of the subitems of the menu by means of a first user input, for example by means of a mouse click and/or by touching by means of a finger if the display unit is in the form of a touch display. Alternatively, the user input can be effected by a user moving a cursor over one of the subitems of the menu. In order to determine the user input, the information device may have an input unit and/or a display unit which is in the form of a touch display.

In one further development, a first point on the display unit can be selected by means of the first user input, wherein the first point on the display unit is within a subitem of the menu and/or on one of the subitems of the menu. In other words, a subitem of the menu can be selected if a user, for example a cursor and/or a mouse or a computer mouse, lies on a first point on the display unit or moves onto a first point on the display unit, wherein the first point on the display unit is within a subitem of the first menu and/or on one of the subitems of the menu.

In a third step 106, a window having one or more control elements is identified on the basis of the selection of the subitem of the menu. The one or more control elements of the window can be selected, in particular, by means of a further, second user input.

In a fourth step 108, the identified window having the one or more control elements is presented on the display unit on one side or adjacent to one side and/or instead of the first menu. In one embodiment, the window can be presented directly adjacent to the menu and/or at a distance from the menu. In one further development, the window can be presented at a first position on the display unit.

In one embodiment, the window can close again as soon as a user changes to a further, different subitem of the first menu and/or moves away from the first subitem of the first menu and/or from the first menu, for example using a cursor or a finger if the display unit is in the form of a touch display. If the cursor or the finger of a user, if the display unit is in the form of a touch display, changes to a further subitem of the first menu and a further, different subitem of the first menu is therefore selected, a further, third menu can open, in particular. The third menu is consequently identified on the basis of the selection of the further, different subitem of the first menu.

In a fifth step 110, a third user input is received, wherein the window is positioned and/or fixed on the display unit by means of the third user input independently of a first position of the menu on the display unit. The window can be advantageously positioned at a second position on the display unit by means of the third user input independently of a first position of the menu on the display unit. In other words, a user can position and/or shift the window on the display unit by means of the third user input independently of the menu on the display unit. As a result, the window is advantageously pinned to the user interface and is no longer automatically closed. Furthermore, a window can be embedded in a user interface, as a result of which this window belongs to the associated user interface and is changeable with the latter. A user input can be carried out, for example, by means of a mouse click and/or by touching the display unit using a finger if the display unit is in the form of a touch display. In order to determine the user input, the information device may have an input unit and/or a display unit which is in the form of a touch display.

In one further development, a path on the display unit can be predefined by means of the third user input, wherein the window is shifted along the predefined path independently of the first position of the menu on the display unit. The window can be advantageously shifted along the predefined path from a first position of the window to a second position of the window.

In one configuration, a size of the window positioned independently of the first position of the menu on the display unit can be changed, in particular, by means of a fourth user input. In other words, the window can be positioned, shifted and/or changed as a separate window independently of the menu. For example, the window can be increased or reduced as a separate window.

In one embodiment, a control element of the window can be selected, for example, by means of a fifth user input, wherein an action is triggered on the basis of the selection of the control element of the window. A user can advantageously click on and/or select and/or drag a control element of the window, thus triggering an action, for example inside the information device or outside the information device. A user can likewise advantageously make inputs to a control element inside the window and/or can change values inside the window.

In one advantageous configuration, the window can also be closed again by a user.

In another advantageous embodiment, the window or else a plurality of windows can be embedded and/or integrated in a work area and/or in a worksheet on the display unit, preferably at a particular position in the work area and/or in the worksheet. The integrated window can therefore be changed and/or processed together with the work area. As a result, a user can create individual or personalized work areas and/or worksheets with one or more integrated windows. In one further development, in addition to the window, a third menu can be positioned on the display unit independently of a first position of the first menu and/or independently of a second position of the window. In other words, a third menu can be positioned on the display unit independently of the first menu and/or independently of the window. For this purpose, the third menu can be identified on the basis of a selection of a subitem of the first menu, wherein the identified third menu having one or more control elements is advantageously presented at a third position on the display unit. The third menu can consequently run through the method 100 according to the window. In this case, the window can advantageously remain positioned on the display unit or the position of the window on the display unit can be changed independently of the position of the first menu and/or of the third menu, in particular by means of a user input.

Figure 2:
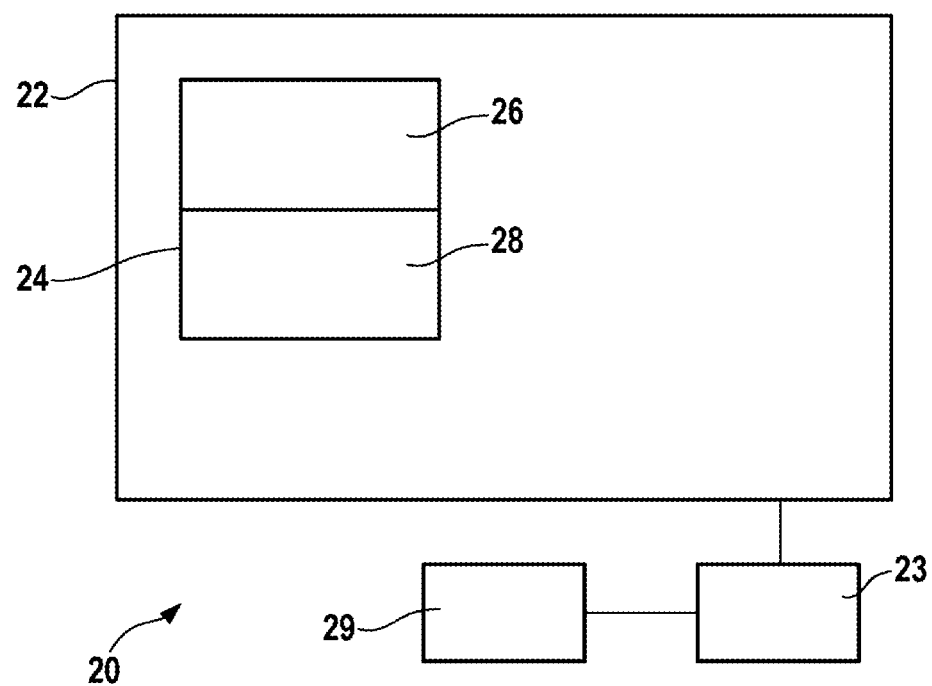
FIG. 2 shows a schematic illustration of a perspective view of an information device according to one exemplary embodiment of the present invention.

FIG. 2 shows an advantageous schematic illustration of a perspective view of an information device 20. In this advantageous embodiment, the information device 20 has a display unit 22. The display unit 22 of the information device 20 is connected, in particular, to a computing unit 23 or to a control device 23. The computing unit 23 advantageously calculates the data or image data to be presented on the display unit 22. The image data calculated in the computing unit 23 are transmitted to the display unit 22 and are consequently presented on the display unit 22. In this embodiment, a menu 24 is presented on the display unit 22. The menu 24 is presented at a first position on the display unit 22. In other words, the menu 24 is presented on an interface of the display unit 22. The menu 24 has at least one subitem 26, 28. In this configuration, the menu 24 has a first subitem 26 and a second subitem 28.

A user can make a user input on the information device 20. For this purpose, the information device 20 advantageously has at least one input apparatus 29 for capturing at least one user input. The input apparatus 29 is advantageously connected to the computing unit 23. The input apparatus 29 is in the form of a computer mouse and/or a keyboard, for example. A user input can be preferably carried out by means of the computer mouse and/or by means of the keyboard. In one further development, the display unit 22 may be in the form of a touch display, wherein a user input can consequently be carried out by touching the display unit 22 and/or by swiping on the display unit 22.

Figure 3:
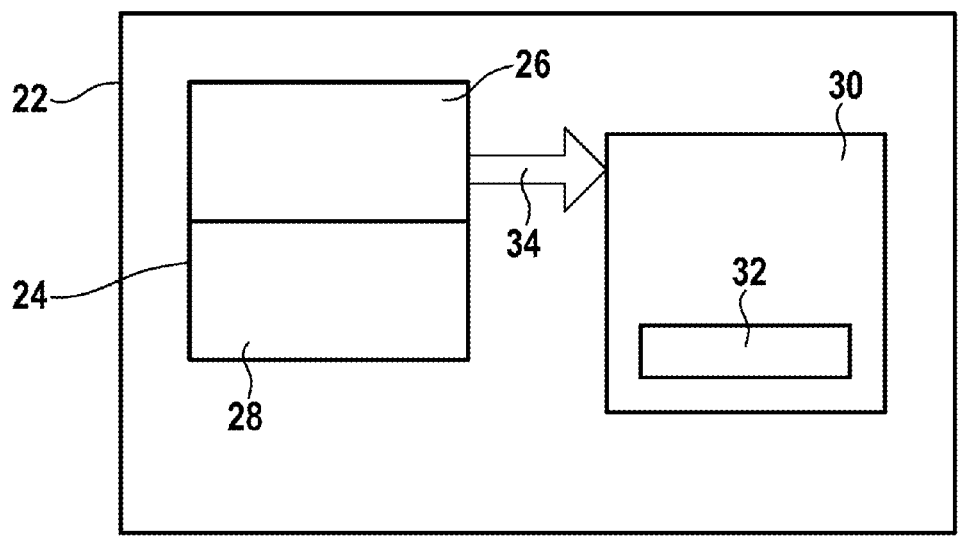
FIG. 3 shows a schematic illustration of a display unit having a menu and having a window according to one exemplary embodiment of the present invention.

FIG. 3 shows an advantageous schematic illustration of a display unit 22. A menu 24 having at least one subitem is presented at a first position on the display unit 22. The presentation of the menu 24 at a first position on the display unit 22 can be triggered by a user input.

The menu 24 preferably has a first subitem 26 and a second subitem 28, wherein the first subitem 26 and the second subitem 28 are arranged below one another. In this embodiment, one of the two subitems 26, 28 of the first menu 24 is selected by means of a first user input, wherein the first subitem 26 of the first menu 24 has been selected in this embodiment. On the basis of the selection of the first subitem 26 of the menu 24, a window 30 is identified, for example by means of the computing unit of the information device, and is presented on the display unit 22.

The window 30 is presented on one side and/or instead of the menu 24 and/or adjacent to one side of the first menu 24. In this embodiment, the window 30 is presented on the display unit 22 to the right of the first menu 24 based on a point of view of the viewer or a user. In one advantageous embodiment, the window 30 is presented as a dropout menu. A dropout menu can also be referred to as a fly-out menu or as a pop-up menu.

A first arrow 34 is used to illustrate that the window 30 is identified and presented on the basis of the selection of the first subitem 26 of the first menu 24. For this purpose, the first arrow 34 preferably begins with an end at the first subitem 26 of the first menu 24 and points to the window 30. This can preferably also be illustrated by extending the first subitem 26 of the first menu 24 into the window 30.

As an alternative, the window 30 can also cover the menu 24 upon opening or the menu 24 can be replaced with the window 30. The menu 24 would therefore no longer be visible to a viewer.

The window 30 has, in particular, one or more control elements 32, wherein the one or more control elements 32 can be selected by means of a further, second user input. In this configuration, the window 30 has a control element 32. The control element 32 is presented in the window 30 on the display unit 22.

Figure 4A:
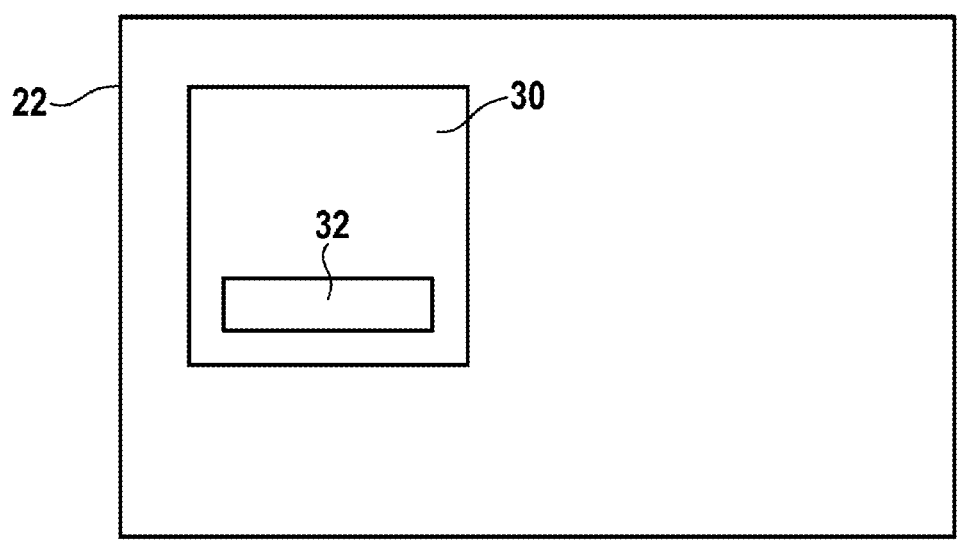
FIG. 4 shows a schematic illustration of a display unit having a menu and having a window according to one exemplary embodiment of the present invention.

FIG. 4 shows an advantageous schematic illustration of a display unit 22 according to FIG. 3. In contrast to FIG. 3, the menu 24 is covered by the window 30 upon opening of the window 30 in FIG. 4a. In other words, the window 30 covers the menu 24 upon opening. Furthermore, the menu 24 can be replaced with the window 30. The menu 24 would therefore no longer be visible to a viewer.

Figure 4B:
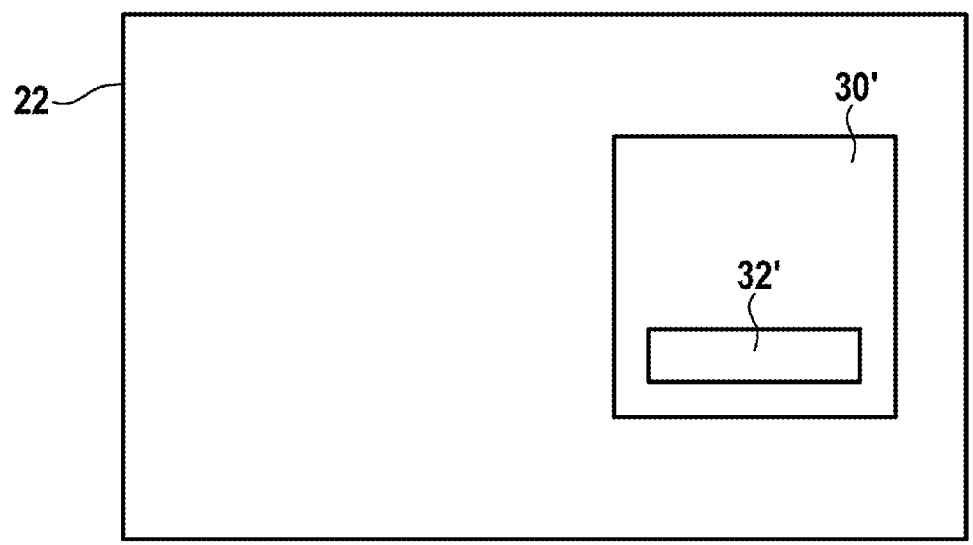

FIG. 4b shows an advantageous schematic illustration of a display unit 22 according to FIG. 4a. A window 30' having a control element 32' is presented on the display unit 22. In contrast to FIG. 4a, the window 30' is presented at a changed position and/or in a manner pinned on the display unit 22 or a user interface in FIG. 4b. The window 30' has been positioned and/or shifted on the display unit 22 by means of a third user input independently of a first position of the first menu 24. In other words, the window 30' having the control element 32' is presented and/or positioned in a manner separated from the first menu 24 at an independent position on the display unit 22 and no longer closes automatically, in particular. In one further development, a user can make further user inputs, in particular a fourth user input and/or a fifth user input, in the window 30'.

In another advantageous embodiment, the window or else windows can be embedded and/or integrated in a work area and/or in a worksheet on the display unit, preferably at a particular position in the work area and/or in the worksheet. The integrated window can therefore be changed and/or processed together with the work area. As a result, a user can create individual or personalized work areas and/or worksheets with one or more integrated windows.

Figure 5:
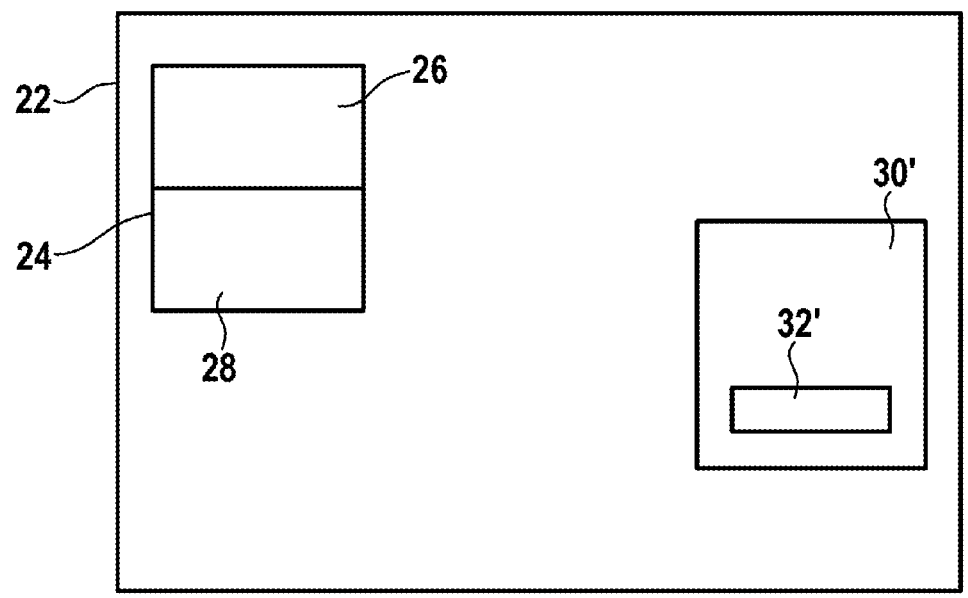
FIG. 5 shows a schematic illustration of a display unit having a menu and having a window according to one exemplary embodiment of the present invention.

FIG. 5 shows an advantageous schematic illustration of a display unit 22 according to FIG. 3. A menu 24 and a second window 30' having a control element 32' are presented on the display unit 22. In contrast to FIG. 3, the window 30' is presented at a changed position and/or in a manner pinned on the display unit 22 or a user interface in FIG. 5. The window 30' has been positioned and/or shifted on the display unit 22 by means of a third user input independently of a first position of the first menu 24. In other words, the window 30' having the control element 32' has been presented and/or positioned in a manner separated from the first menu 24 at an independent position on the display unit 22 and no longer closes automatically. In one further development, a user can make further user inputs, in particular a fourth user input and/or a fifth user input, in the window 30'.

In another advantageous embodiment, the window or else windows can be embedded and/or integrated in a work area and/or in a worksheet on the display unit, preferably at a particular position in the work area and/or in the worksheet. The integrated window can therefore be changed and/or processed together with the work area. As a result, a user can create individual or personalized work areas and/or worksheets with one or more integrated windows.

Figure 6:
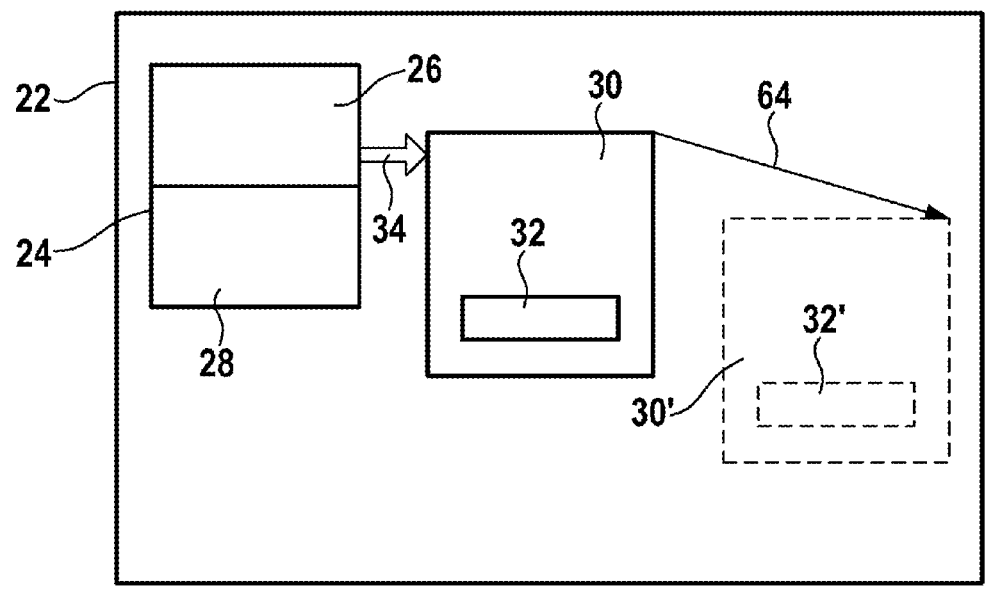
FIG. 6 shows a schematic illustration of a display unit having a menu and having a window according to one exemplary embodiment of the present invention.

FIG. 6 shows an advantageous schematic illustration of a display unit 22 according to FIG. 3. A menu 24 and a window 30 are presented on the display unit 22. In contrast to FIG. 3, a second arrow 64 is used in FIG. 6 to illustrate how the window 30 can be shifted along the predefined path, illustrated here according to the second arrow 64, from the first position of the window 30 to the second position of the window 30'. In other words, the window 30 having the control element 32 can be shifted along the second arrow 64 on the display unit 22, preferably by means of the third user input. Accordingly, the window 30' having the control element 32' is positioned on the display unit 22. The window 30' can be positioned independently of the menu 24 and/or independently of a first position of the menu 24.

As an alternative, the window 30 can also cover the menu 24 upon opening or the menu 24 can be replaced with the window 30. The menu 24 would therefore no longer be visible to a viewer.

Figure 7:
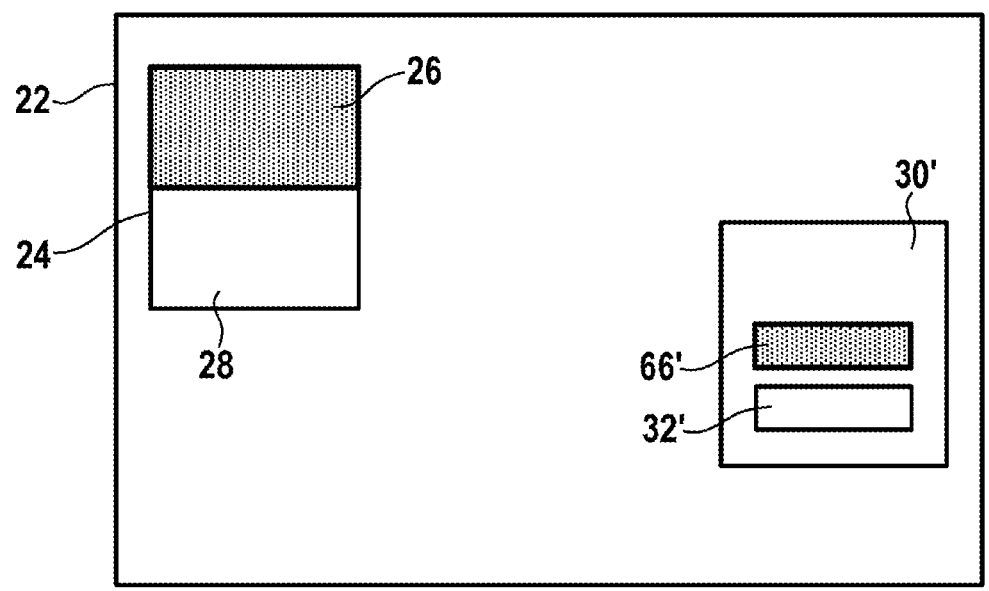
FIG. 7 shows a schematic illustration of a display unit having a first menu and having a window according to one exemplary embodiment of the present invention.

FIG. 7 shows an advantageous schematic illustration of a display unit 22 according to FIG. 5. A menu 24 and a window 30' are presented on the display unit 22, wherein the window 30' has been positioned on the display unit 22 independently of a first position of the menu 24. In this embodiment according to FIG. 7, the first subitem 26 of the first menu 24 or the content of the first subitem 26 of the first menu 24 has been transferred to the window 30'. As a result, the first subitem 26 of the first menu 24 is presented in the window 30' by means of a control element 66'. In other words, the control element 66' is presented in the window 30' according to the first subitem 26 of the first menu 24. This makes it possible to signal to the user that the window 30' has been identified according to the first subitem 26 and/or has been identified as window 30' by means of a first user input, wherein the first subitem 26 of the first menu 24 was selected by means of the first user input. In one further development, a user can make further user inputs, in particular a fourth user input and/or a fifth user input, in the window 30'.

As an alternative, the window 30 can also cover the menu 24 upon opening or the menu 24 can be replaced with the window 30. The menu 24 would therefore no longer be visible to a viewer.

Figure 8:
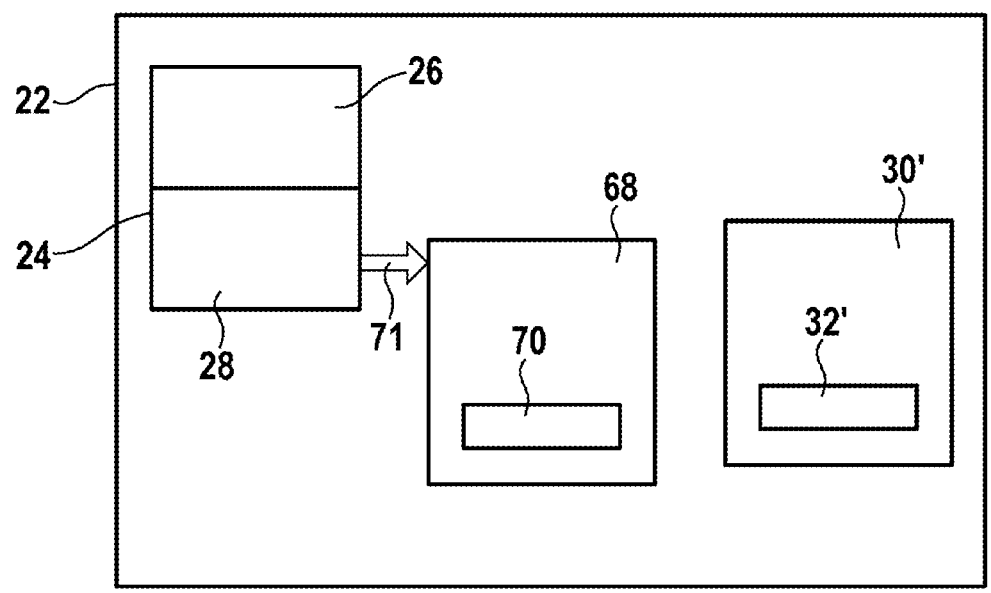
FIG. 8 shows a schematic illustration of a display unit having a menu, having a window and having a second window according to one exemplary embodiment of the present invention.

FIG. 8 shows an advantageous schematic illustration of a display unit 22 according to FIG. 5. A menu 24 and a window 30' are presented on the display unit 22, wherein the window 30' has been positioned or pinned on the display unit 22 independently of a first position of the first menu 24. In this embodiment according to FIG. 8, one of the two subitems 26, 28 of the menu 24 is selected by means of a first user input, wherein the second subitem 28 of the menu 24 has been selected in this embodiment. On the basis of the selection of the second subitem 28 of the menu 24, a second window 68 is identified, for example by means of the computing unit of the information device, and is presented on the display unit 22.

The second window 68 is presented on one side of the first menu 24 and/or adjacent to one side of the first menu and/or instead of the menu 24. In this embodiment, the third menu 68 is presented on the display unit 22 to the right of the first menu 24 on the basis of a point of view of the viewer or a user. In one advantageous embodiment, the third menu 68 is presented as a dropout menu. A dropout menu can also be referred to as a fly-out menu or a pop-up menu.

A third arrow 71 is used to illustrate that the third menu 68 is identified and presented on the basis of the selection of the second subitem 28 of the first menu 24. For this purpose, the third arrow 71 preferably begins with an end at the second subitem 28 of the first menu 24 and points to the third menu 68. This can preferably also be illustrated by extending the second subitem 28 of the first menu 24 into the third menu 68.

As an alternative, the window 30 can also cover the menu 24 upon opening or the menu 24 can be replaced with the window 30. The menu 24 would therefore no longer be visible to a viewer.

The second window 68 has, in particular, one or more control elements 70, wherein the one or more control elements 70 can be selected by means of a further, second user input. In this configuration, the second window 68 has a control element 70. The control element 70 is presented in the second window 68 on the display unit 22.

Figure 9:
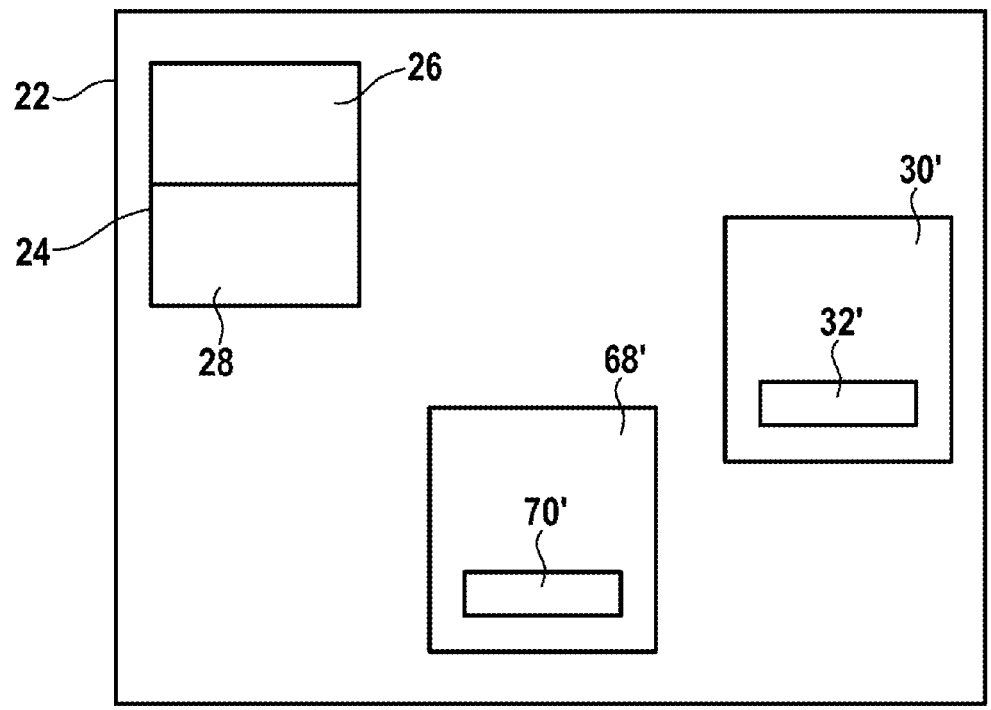
FIG. 9 shows a schematic illustration of a display unit having a menu, having a first window and having a second window according to one exemplary embodiment of the present invention.

FIG. 9 shows an advantageous schematic illustration of a display unit 22 according to FIG. 5. A menu 24 and a window 30' are presented on the display unit 22, wherein the first window 30' has been positioned on the display unit 22 independently of a first position of the menu 24. In this embodiment according to FIG. 9, a second window 68' has been positioned on the display unit 22 independently of the first position of the menu 24 and/or independently of a second position of the first window 30'. The second window 68' has one or more control elements 70'. The second window 68' can also be accordingly shifted and/or positioned on the display unit 22 independently of the menu 24 and/or independently of the first window 30'.

As an alternative, the window 30 can also cover the menu 24 upon opening or the menu 24 can be replaced with the window 30. The menu 24 would therefore no longer be visible to a viewer.

In another advantageous embodiment, the first window 30' and/or the second window 68' or else a plurality of windows can be embedded and/or integrated in a work area and/or in a worksheet on the display unit, preferably at a particular position in the work area and/or in the worksheet. The integrated window can therefore be changed and/or processed together with the work area. As a result, a user can create individual or personalized work areas and/or worksheets with one or more integrated windows.

The invention claimed is:

1. A method for operating an information device (20) having at least one display unit (22), wherein the method comprises:
   presenting a menu (24) having at least one subitem (26, 28) at a first position on the display unit (22);
   receiving a first user input, wherein one of the subitems (26, 28) of the menu (24) is selected by means of the first user input;
   identifying, on the basis of the selection of the subitem (26, 28) of the menu (24), a window (30) having one or more control elements (32, 66, 70, 72) which can be selected by means of a further, second user input;

presenting the identified window (30) having the one or more control elements (32, 66, 70, 72) on the display unit (22), wherein the identified window (30) is automatically positioned in response to receiving the first user input non-overlappingly on one side of the menu (24), non-overlappingly adjacent to one side of the menu (24), or instead of the menu (24);

receiving a third user input, wherein a position of the window (30) on the display unit (22) is altered by means of the third user input independently of a first position of the menu (24) on the display unit (22);

receiving a subsequent user input, wherein a different one of the subitems (26, 28) of the menu (24) is selected by means of the subsequent user input;

automatically removing the identified window (30) from the display unit (22) in response to receiving the subsequent user input only when the subsequent user input is received before the third user input is received; and continuing to display the identified window (30) on the display unit (22) after receiving the subsequent user input when the subsequent user input is received after the third user input is received.

2. The method as claimed in claim 1, wherein a path on the display unit (22) is predefined by means of the third user input, wherein the window (30) is shifted along the predefined path independently of the first position of the menu (24) on the display unit (22).

3. The method as claimed in claim 2, wherein the window (30) is shifted along the predefined path from a first position of the window (30) to a second position of the window (30).

4. The method as claimed in claim 1, wherein a first point on the display unit (22) is selected by means of the first user input, wherein the first point on the display unit (22) is within one of the two subitems (26, 28) of the first menu (24) and/or on one of the two subitems (26, 28) of the first menu (24).

5. The method as claimed in claim 1, wherein a size of the window (30) positioned independently of the first position of the menu (24) on the display unit (22) can be changed by means of a fourth user input.

6. The method as claimed in claim 1, wherein a second window (68) can be positioned on the display unit (22) independently of a first position of the menu (24) and/or independently of a second position of the first window (30).

7. The method as claimed in claim 1, wherein the menu (24) and/or the window (30) is/are presented as a dropout menu.

8. The method as claimed in claim 1, wherein one or more subitems (26, 28) and/or contents of the menu (24) can be presented in the window (30).

9. The method as claimed in claim 1, wherein a fifth user input is received, wherein a control element of the window (30) is selected by means of the fifth user input, and wherein an action is triggered on the basis of the selection of the control element of the window (30).

10. The method as claimed in claim 1, wherein a user input is made by one selected from the group consisting a computer mouse, a keyboard, by touching the display unit (22), and by swiping on the display unit (22).

11. An information device, wherein a method as claimed in claim 1 can be carried out on the information device (20).

12. The information device (20) as claimed in claim 11, having at least one display unit (22) for presenting a menu (24) having at least one subitem (26, 28) and for presenting the window (30) having one or more control elements.

13. The information device (20) as claimed in claim 12, having at least one input apparatus for capturing at least one user input.

14. The information device (20) as claimed in claim 12, wherein the display unit (22) is in the form of a touch display.

15. The method as claimed in claim 1, wherein receiving the first user input includes receiving a cursor movement input placing a cursor on the selected subitem (26, 28) of the menu (24), the method further comprising:

receiving a subsequent user input moving the cursor away from the selected subitem (26,28); and automatically removing the identified window (30) from the display unit (22) in response to receiving the subsequent user input before the third user input is received.

16. A method for operating an information device (20) having at least one display unit (22), wherein the method comprises:

presenting a menu (24) having at least one subitem (26, 28) at a first position on the display unit (22);

receiving a first user input, wherein one of the subitems (26, 28) of the menu (24) is selected by means of the first user input;

identifying, on the basis of the selection of the subitem (26, 28) of the menu (24), a window (30) having one or more control elements (32, 66, 70, 72) which can be selected by means of a further, second user input;

presenting the identified window (30) having the one or more control elements (32, 66, 70, 72) on the display unit (22) by presenting the identified window (30) on the display unit (22) with a visual indication of the selected subitem with which the identified window (30) is associated, wherein the identified window (30) is automatically positioned in response to receiving the first user input non-overlappingly on one side of the menu (24), non-overlappingly adjacent to one side of the menu (24), or instead of the menu (24);

receiving a third user input, wherein a position of the window (30) on the display unit (22) is altered by means of the third user input independently of a first position of the menu (24) on the display unit (22); and automatically removing the visual indication from the display unit (22) in response to receiving the third user input.

17. A non-transitory computer-readable medium comprising program instructions which, when executed by a computer, cause the computer to present a menu (24) having at least one subitem (26, 28) at a first position on the display unit (22);

receive a first user input, wherein one of the subitems (26, 28) of the menu (24) is selected by means of the first user input;

identify, on the basis of the selection of the subitem (26, 28) of the menu (24), a window (30) having one or more control elements (32, 66, 70, 72) which can be selected by means of a further, second user input;

present the identified window (30) having the one or more control elements (32, 66, 70, 72) on the display unit (22), wherein the identified window is automatically positioned in response to receiving the first user input non-overlappingly on one side of the menu (24), non-overlappingly adjacent to one side of the menu (24), or instead of the menu (24);

receive a third user input, wherein the window (30) is positioned on the display unit (22) by means of the third user input independently of a first position of the menu (24) on the display unit (22);

receive a subsequent user input, wherein a different one of the subitems (26, 28) of the menu (24) is selected by means of the subsequent user input;

automatically remove the identified window (30) from the display unit (22) in response to receiving the subsequent user input only when the subsequent user input is received before the third user input is received; and continue to display the identified window (3) on the display unit (22) after receiving the subsequent user input when the subsequent user input is received after the third user input is received.

18. A non-transitory computer-readable medium comprising program instructions which, when executed by a computer, cause the computer to present a menu (24) having at least one subitem (26, 28) at a first position on the display unit (22), receive a first user input, wherein one of the subitems (26, 28) of the menu (24) is selected by means of the first user input, identify, on the basis of the selection of the subitem (26, 28) of the menu (24), a window (30) having one or more control elements (32, 66, 70, 72) which can be selected by means of a further, second user input, present the identified window (30) having the one or more control elements (32, 66, 70, 72) on the display unit (22) by presenting the identified window (30) on the display unit (22) with a visual indication of the selected subitem with which the identified window (30) is associated, wherein the identified window is automatically positioned in response to receiving the first user input non-overlappingly on one side of the menu (24), non-overlappingly adjacent to one side of the menu (24), or instead of the menu (24), receive a third user input, wherein the window (30) is positioned on the display unit (22) by means of the third user input independently of a first position of the menu (24) on the display unit (22), and automatically remove the visual indication from the display unit (22) in response to receiving the third user input.

* * * * *